No. 745,074. PATENTED NOV. 24, 1903.
J. P. ROCHE.
METHOD OF PREPARING FOOD PRODUCTS.
APPLICATION FILED APR. 25, 1902.
NO MODEL.
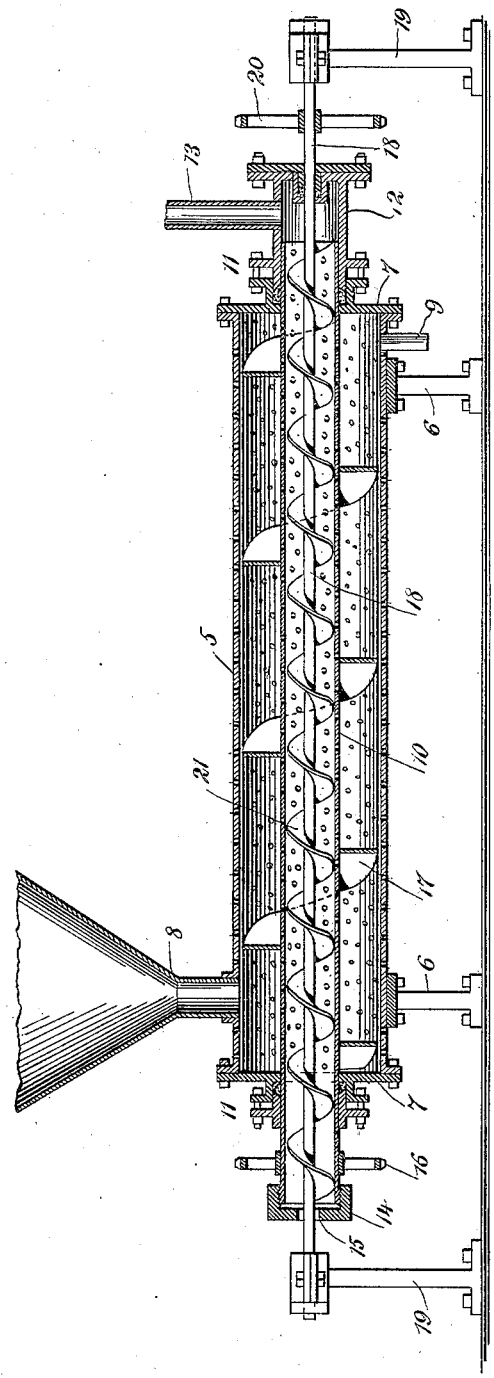
WITNESSES:
William P. Goebel
H. F. Bernhard
INVENTOR
James P. Roche
BY
ATTORNEYS.

No. 745,074. Patented November 24, 1903.

UNITED STATES PATENT OFFICE.

JAMES P. ROCHE, OF LOUISVILLE, KENTUCKY.

METHOD OF PREPARING FOOD PRODUCTS.

SPECIFICATION forming part of Letters Patent No. 745,074, dated November 24, 1903.

Application filed April 25, 1902. Serial No. 104,634. (No specimens.)

*To all whom it may concern:*

Be it known that I, JAMES P. ROCHE, a citizen of the United States, and a resident of Louisville, in the county of Jefferson and State of Kentucky, have invented a new and Improved Method of Preparing Food Products, of which the following is a full, clear, and exact description.

My invention relates to a method of eliminating water from distillery-slop and simultaneously producing a composite feed material which consists of vegetable material enriched by the food constituents of the liquid portions of the slop.

It has been desired for a considerable length of time to utilize the gluten contained in distillery residue in the useful arts; but, so far as known to me, no simple, economical, and practicable way has yet been devised.

In the attainment of the object of my present invention I bring into proximity to each other separate layers or strata of a vegetable feed material and of distillery residue or "slops" and utilize the vegetable feed material as a filtration layer for the liquid and semiplastic glutinous matters, which make their exit from the distillery residue and saturate the filtration layer, the latter retaining or absorbing the semiplastic glutinous matter which is carried by the escaping liquid from the granular portion of the distillery residue. I prefer to entirely surround the layer or stratum of distillery residue by the filtering and absorbent stratum of vegetable feed material, the two or more strata of surrounding material being mechanically isolated from the distillery residue and from each other, so as to avoid any mechanical admixture of the granular portion of the distillery residue with the absorbent feed material.

Another feature of my invention consists in feeding layers or strata of different materials in parallel or concentric paths and utilizing the layer or layers of added feed material as the filtering material, thus bringing fresh materials in coöperative disposition and carrying out the process in an economical and satisfactory manner. The feeding or movement of either of the layers of material may be carried on continuously or intermittently, and in order to attain a high degree of efficiency the distillery residue is forced or fed under pressure—say at or about a pressure of sixty (60) pounds to the square inch—while at the same time the granular portion of this residue is mechanically isolated and prevented from commingling with the adjacent layer of feed material, whereby the liquid and semiliquid is free to become absorbed by or mingled with the feed material.

In order that others skilled in the art may understand the invention, I have illustrated a suitable form of apparatus by which the process may be advantageously carried out. The apparatus is shown by the accompanying drawing, in which the figure represents a vertical longitudinal section through the machine. I would have it understood, however, that the present invention is not restricted to the apparatus, because the process may be carried out by many different forms of machine and in other ways than by machinery.

5 designates a horizontally-arranged casing, which is supported in a stationary position by means of suitable standards 6, said casing being perforated and provided at its ends with the heads 7. At one end of the casing is secured the feed-hopper 8, adapted for the inlet of the vegetable feed material, and at the opposite end of said casing is an outlet 9, from which is adapted to emerge the food product in a wet or saturated condition.

10 designates an interior concentric casing or tube, which is disposed centrally within the casing 5 and is arranged to rotate freely therein. The heads 7 of the casing 5 are equipped with the stuffing-boxes 11, through which are extended or carried the end portions of the concentric inner tube or casing 10. A feed-head 12 embraces the receiving end of the revoluble tube or casing 10, and to this head is attached the pipe 13, through which the distillery refuse is forced under pressure—as, for example, by means of a pump or other mechanical appliance. The other end of the revoluble internal casing or tube 10 is equipped with a cap 14, having an axial discharge-opening 15, and to this protruding end of the revoluble tube or casing 10 is secured a means adapted to rotate the tube or casing on its axis—as, for example, a sprocket-wheel 16. The tube or casing 10 has secured exteriorly thereto a spiral or screw feeder 17, which is arranged to rotate with the tube and is operatively disposed within the stationary casing 5.

A feed-shaft 18 extends centrally through the internal revoluble tube or casing 10, and the exposed ends of said shaft are journaled in suitable bearings in the standards 19. Said shaft is equipped with a suitable means for rotating the same—as, for example, the sprocket-wheel 20, and the shaft is furthermore provided with a spiral or screw feeder 21, the latter being disposed within the casing or tube 10. This casing or tube is constructed of perforated material, and it serves to mechanically isolate the layer of distillery refuse from the surrounding layer of vegetable food material, thereby preventing any mechanical admixture of the granular portion of the distillery refuse with the vegetable food material.

In operation a proper quantity of vegetable food material—cotton-seed hulls, for instance—is introduced by the hopper 8 into the casing 5, so as to fill the latter from end to end, and distillery refuse is forced or pumped under pressure through the pipe 13, and thereby caused to traverse the perforated tube or casing 10. The driving elements 16 20 having been set in motion, the perforated tube or casing 10 and the shaft 18 are driven in opposite directions, and the feeder 17 operates to force the vegetable food material in one direction through the casing 5, while the other feeder, 21, carries the granular portion of the distillery refuse in an opposite direction through the perforated tube or casing 10. The distillery refuse being forced under pressure into the tube or casing 10 and the granular portion of this refuse being mechanically isolated from the feed material in the casing 5, the glutinous nutritious matter contained in the distillery-refuse is expressed and carried with the escaping water and liquid through the perforated tube or casing 10 and into the surrounding mass or layer of feed material which is present in the casing 5. The expressed liquid and semiliquid matters are partially absorbed by the surrounding mass of feed material, the latter serving as a filtering agent for the same, the water escaping through the perforations of the case 5, while the glutinous matters are retained by this surrounding mass of material, thus increasing the nutritious value of the feed product. The granular portion of the distillery refuse is discharged through the opening 15, while the saturated vegetable matter charged with the glutinous extract escapes through the opening 9, after which this desirable matter may be dried or otherwise mechanically treated to reduce it to a proper condition for a stock-feed.

Although I have shown and described one specific form of apparatus by which my process may be practiced with advantage, it is to be understood that various other forms of mechanical appliances may be resorted to or that the process may be carried out in part by manual labor—as, for example, the layers of material may be brought into proximity and fed or moved in parallel paths by rakes or otherwise, and the glutinous semi-liquid is expressed from the distillery residue and is impregnated or charged into the vegetable feed material.

Although I mention the use of no other vegetable substances than cotton-seed hulls as the agent for filtering and for absorbing and retaining valuable substance, it is to be understood that other materials of various kinds can be used as agents for filtering and for absorbing and retaining valuable substances, such filtering materials being made valuable or being enhanced in value by the absorption and retention of desirable matter from the distillery residue.

Having thus described my invention, I claim as new and desire to secure by Letters Patent—

1. The herein-described method of making a composite food product of a vegetable feed material, and the food constituents of the liquor of distillery-slop, which consists in forcing the liquid portion of distillery-slop by pressure through a separating medium for preventing the mingling of the vegetable feed material and the coarser portions of the distillery-slop, and then forcing such liquid constituent through the vegetable feed material, whereby the latter operating as a filtering medium will eliminate and incorporate within itself the valuable food elements of the distillery-slop liquor and the water will be discharged by such pressure from the composite food product.

2. The herein-described method of utilizing the food constituents in the liquor of distillery-slop, which consists in forcing the liquor of the slop into a vegetable vehicle and meanwhile maintaining the coarser granular portion of the slop separate from the vehicle for the liquor of the slop.

3. The herein-described method of eliminating the liquid portion from distillery-slop and simultaneously enriching a vegetable feed material, which consists in forcing the liquid portion of the slop out of the same into and through a bed of vegetable material contiguous to and isolated from the slop.

In testimony whereof I have signed my name to this specification in the presence of two subscribing witnesses.

JAMES P. ROCHE.

Witnesses:
JAMES L. CORCORAN,
ANDREW J. CORCORAN.